(12) United States Patent
Okada

(10) Patent No.: US 11,162,872 B2
(45) Date of Patent: Nov. 2, 2021

(54) DEVICE FOR EVALUATING TIRE ROLLING RESISTANCE

(71) Applicant: KOBE STEEL, LTD., Hyogo (JP)

(72) Inventor: Toru Okada, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 370 days.

(21) Appl. No.: 16/332,475

(22) PCT Filed: Aug. 30, 2017

(86) PCT No.: PCT/JP2017/031149
§ 371 (c)(1),
(2) Date: Mar. 12, 2019

(87) PCT Pub. No.: WO2018/056005
PCT Pub. Date: Mar. 29, 2018

(65) Prior Publication Data
US 2020/0292418 A1 Sep. 17, 2020

(30) Foreign Application Priority Data
Sep. 20, 2016 (JP) .............................. JP2016-183371

(51) Int. Cl.
*G01M 17/02* (2006.01)
*B60C 19/00* (2006.01)
*G01M 17/007* (2006.01)

(52) U.S. Cl.
CPC .......... *G01M 17/022* (2013.01); *B60C 19/00* (2013.01); *G01M 17/0074* (2013.01); *B60C 2019/004* (2013.01)

(58) Field of Classification Search
None
See application file for complete search history.

(56) References Cited

U.S. PATENT DOCUMENTS 6,606,569 B1 * 8/2003 Potts .................. G01L 5/00
702/41
7,434,454 B2 * 10/2008 Matsumoto ......... G01M 17/022
451/1

(Continued)

FOREIGN PATENT DOCUMENTS

EP 2793013 A1 10/2014
EP 2 894 452 A1 7/2015

(Continued)

OTHER PUBLICATIONS

The extended European search report issued by the European Patent Office dated Apr. 30, 2020, which corresponds to European Application No. 16/332,475-1001 and is related to U.S. Appl. No. 16/332,475.

(Continued)

*Primary Examiner* — Andre J Allen
*Assistant Examiner* — Jermaine L Jenkins
(74) *Attorney, Agent, or Firm* — Studebaker & Brackett PC

(57) ABSTRACT

A device for evaluating tire rolling resistance, the device includes: load rolls having surfaces that simulate a road surface on which a tire is to travel; a moving mechanism; a load sensor; a position sensor; a phase difference calculation unit; and a rolling resistance evaluation unit. The load rolls are two or more load rolls disposed side by side and are smaller in diameter than the tire.

10 Claims, 13 Drawing Sheets

(56) References Cited

U.S. PATENT DOCUMENTS

| | | | |
|---|---|---|---|
| 9,645,024 B2* | 5/2017 | Okada | G01L 5/16 |
| 10,598,569 B2* | 3/2020 | Okada | G06F 30/20 |
| 2017/0153163 A1 | 6/2017 | Okada | |

FOREIGN PATENT DOCUMENTS

| | | |
|---|---|---|
| GB | 1 511 444 A | 5/1978 |
| JP | S53-005901 U | 1/1978 |
| JP | S54-95401 A | 7/1979 |
| JP | H5-332887 A | 12/1993 |
| JP | 2002-148149 A | 5/2002 |
| JP | 2003-4598 A | 1/2003 |
| JP | 2011-164012 A | 8/2011 |
| JP | 2015-232545 A | 12/2015 |
| WO | 2014/038039 A1 | 3/2014 |

OTHER PUBLICATIONS

International Search Report issued in PCT/JP2017/031149; dated Nov. 21, 2017 with English Translation.
Written Opinion issued in PCT/JP2017/031149; dated Nov. 21, 2017 with English Translation.

* cited by examiner

Direction in which going away from a tire ⟷ Direction in which coming closer to a tire

DEVICE FOR EVALUATING TIRE ROLLING RESISTANCE

TECHNICAL FIELD

The present invention relates to a device for evaluating tire rolling resistance.

BACKGROUND ART

One of important measurement items in measurement of properties and performance of a tire of a truck, a car, or some other vehicle is the rolling resistance of the tire.

The rolling resistance of a tire is a force in the tangential direction that occurs between the tire and a ground when the tire is rolled on the ground. In a tire testing machine, the rolling resistance of a test tire is measured as a force in the tangential direction that occurs between the tire and a counterpart surface (e.g., the surface of a load drum) that rotates being in contact with the tire. That is, when a radial force (load Fz) having a certain magnitude is applied between the tire and the counterpart surface, a rolling resistance Fx corresponding to the load Fz occurs. In this manner, a relationship between the load Fz and the rolling resistance Fx is measured.

Such a rolling resistance measuring method is prescribed in JIS D 4234 (Method for measuring the rolling resistance of tires for cars, trucks, and buses, 2009) as a method using a drum tire running testing machine.

For example, an instrument disclosed in Patent Document 1 is known as a rolling resistance testing machine that conforms to the JIS standard. The rolling resistance measuring instrument disclosed in Patent Document 1 is configured in such a manner that a tire is brought into contact with, that is, pressed against, the outer circumferential surface of a cylindrical load drum (i.e., running drum) and a force and torque (moment) acting in each of the x, y, and z directions is measured by a multi-component force detector for a spindle that supports the tire via a bearing. This instrument of Patent Document 1 is configured so as to measure a relationship between the axial load Fz on the tire and the rolling resistance Fx with a correction on interference between the component forces.

However, it takes a very long time for the rolling resistance measuring instrument of Patent Document 1 to measure rolling resistances of all tires manufactured because it takes considerable time to measure a rolling resistance of one tire.

To reduce the time to measure a rolling resistance of a tire, Patent Document 2 discloses a technique for predicting a rolling resistance coefficient using a tire uniformity tester for testing the uniformity of a tire. It is known that the rolling resistance occurs due to energy loss that is caused by deformation of a tire rubber member during rolling of the tire and is highly correlated with the attenuation property of the tire rubber member. In view of this, in Patent Document 2, a method for predicting a rolling resistance coefficient by measuring an attenuation property that appears as a phase difference between the drum displacement and the reaction force while exciting the tire using a drum that is provided in the tire uniformity tester was devised. This method is characterized in that a phase difference corresponding to an attenuation property of each tire is measured in a uniformity measuring process for testing all tires and abnormal tires are sorted out whose rolling resistance coefficient values are out of a standard range. To sort out abnormal tires, a phase of a reference tire whose rolling resistance coefficient is within the reference range is calculated in advance by the method of Patent Document 2. A measured phase of a tire manufactured is compared with the phase of the reference tire and the tire manufactured is judged defective if the difference is larger than an allowable value.

CITATION LIST

Patent Literature

Patent Document 1: JP-A-2003-4598
Patent Document 2: JP-A-2015-232545

SUMMARY OF INVENTION

Technical Problem

However, in the method of Patent document 2 in which a tire is excited using a load drum, when the load drum has a large mass (i.e., when a load drum whose diameter is larger than a tire diameter is used conventionally in order to make tire deformation closer to that as would occur on a flat surface), it is necessary to increase the capacity of its motive power source in order to obtain a prescribed excitation amplitude. Furthermore, there are problems relating to fatigue damage of the members constituting the drum and vibration and fatigue of the entire device.

The present invention has been made to solve the above problems, and an object of the invention is to provide a device for evaluating tire rolling resistance in which the capacity of an air cylinder that is a motive power source for obtaining an excitation amplitude for a load drum can be decreased and vibration and fatigue damage of the entire device and the members constituting the drum can be reduced.

Solution to Problem

A device for evaluating tire rolling resistance according to the invention includes load rolls having surfaces that simulate a road surface on which a tire is to travel; a moving mechanism configured to move the load rolls alternately in an approaching direction in which the load rolls come closer to the tire and in a leaving direction in which the load rolls go away from the tire; a load sensor configured to detect a load acting on the tire in a state where the surfaces of the load rolls are in contact with the tire; a position sensor configured to detect a position of the load roll in a direction along the approaching direction and the leaving direction; a phase difference calculation unit configured to control the moving mechanism so that the load acting on the tire is varied and calculates a phase difference between a variation of the load and a variation of the position of the load rolls on the basis of signals from the load sensor and the position sensor; and a rolling resistance evaluation unit configured to evaluate a rolling resistance of the tire as an evaluation target by comparing the phase difference calculated for the evaluation target tire by the phase difference calculation unit with a phase difference calculated for a reference tire by the phase difference calculation unit. The load rolls are two or more load rolls disposed side by side and are smaller in diameter than the tire.

According to the embodiment, because of the use of the load rolls that are smaller in diameter than the tire, the mass of the load rolls can be significantly reduced. This makes it possible to decrease the capacity of a motive power source for obtaining a prescribed excitation amplitude for the load rolls and to reduce vibration and fatigue damage of the entire device and the moving mechanism. By disposing the two or more load rolls side by side, the contact state of the tire can be made closer to its actual ground contact state and the curvature of deformation of the tire can be made smaller.

It is preferable that the load rolls be disposed separately from a tire testing machine for testing the tire. Since the load rolls are disposed separately from the tire testing machine, a device for evaluating tire rolling resistance having the same specification can be installed easily in various testing machines of different manufacturers or different types without modifying existing test machines or subjecting them to only simple modifications.

It is preferable that the load rolls be disposed separately from a running drum of the tire testing machine, With this measure, a device for evaluating tire rolling resistance can be installed without modifying an existing tire test machine, in particular, a tire uniformity tester, or subjecting an existing tire test machine, in particular, a tire uniformity tester, to only simple modifications.

It is preferable that the load rolls be two load rolls and the centers of the respective load rolls be located between two straight lines that are tangential to the tire and pass through the center of an imaginary circle that is tangential to the tire and has the same diameter as the outer diameter of the tire.

As the dimension of the two load rolls in the radial direction becomes larger, the distance between the centers of the two load rolls increases and the contact states of the load rolls and the tire become much different from an actual ground contact state of the tire. In view of this, by locating the centers of the load rolls between two straight lines that are tangential to the tire and pass through the center of an imaginary circle that is tangential to the tire and has the same diameter as the outer diameter of the tire, the distance between the centers of the two load rolls can be made small and the contact state of the tire can be made closer to its actual ground contact state.

The device for evaluating tire rolling resistance may be such that the moving mechanism has an air cylinder and the load rolls are configured to apply exciting force to the tire by switching the pressure supplied to the air cylinder between high pressure and low pressure.

Since the moving mechanism has an air cylinder, an inexpensive and simple motive power source can be provided. Switching the pressure supplied to the air cylinder between high pressure and low pressure allows the load rolls to apply stable exciting force to the tire.

Advantageous Effects of Invention

According to the embodiment, because of the use of the load rolls that are smaller in diameter than the tire, the mass of the load rolls can be reduced to a large extent. This makes it possible to decrease the capacity of a motive power source for obtaining a prescribed excitation amplitude for the load rolls and to reduce vibration and fatigue damage of the entire device and the moving mechanism. By disposing the two or more load rolls side by side, the contact state of the tire can be made closer to its actual ground contact state and the curvature of deformation of the tire can be made smaller.

DESCRIPTION OF EMBODIMENTS

Embodiments of the present invention are hereinafter described with reference to the accompanying drawings.

Figure 1:
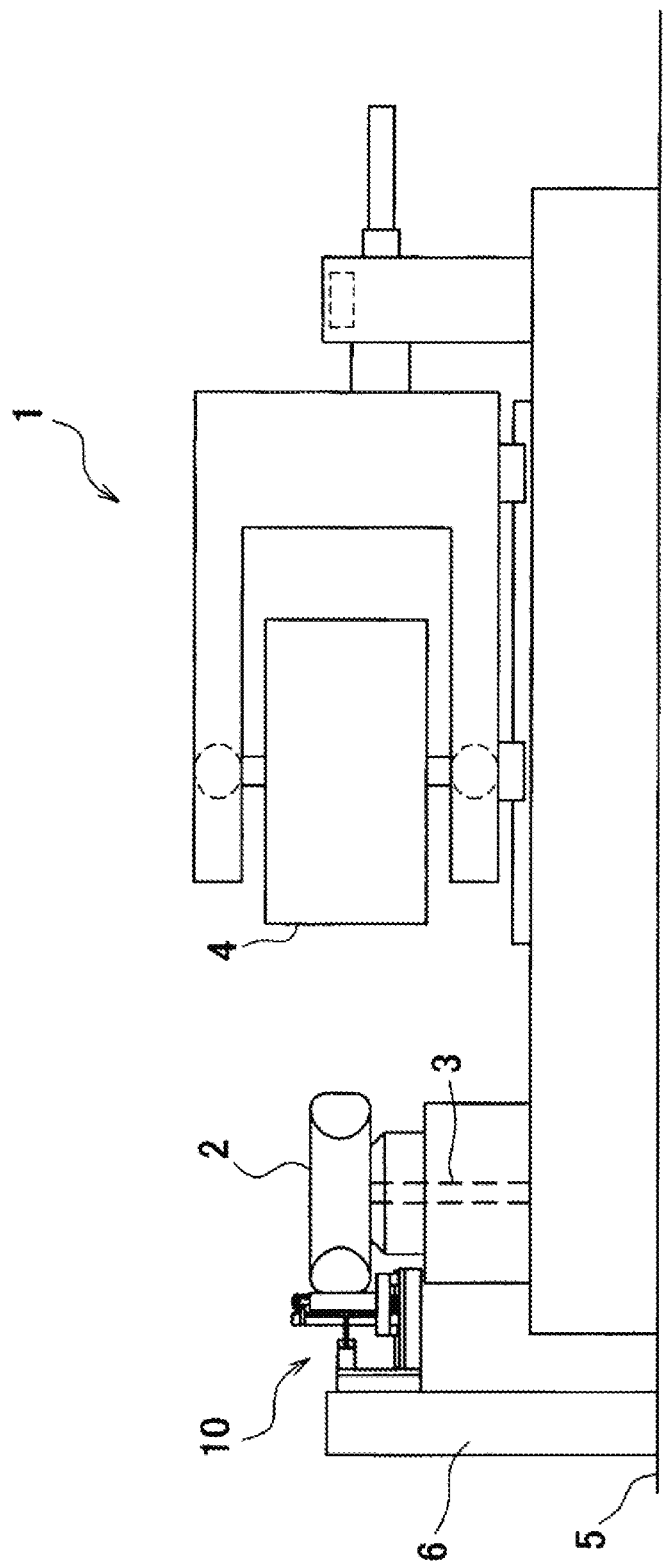
FIG. 1 is a schematic diagram of a device for evaluating tire rolling resistance according to an embodiment of the present invention and a tire uniformity tester.

As shown in FIG. 1, a device for evaluating rolling resistance 10 (hereinafter referred to simply as an "evaluation device") according to this embodiment is installed in a tire uniformity tester (TUM) 1 for performing a tire uniformity test (JIS D 4233) in which the uniformity of a tire 2 in the circumferential direction is tested. Since the evaluation device 10 is installed separately from, rather than integrated with, the tire uniformity tester 1, a load roll 44 (i.e., 44A and 44B) is disposed separately from a running drum 4 of the tire uniformity tester 1. The evaluation device 10 is installed on the opposite side of the tire 2 to the tire uniformity tester 1. The tire 2 is annular shaped and is rotatably supported by a tire shaft 3 that extends in the vertical direction. There are no particular limitations on the place at which the evaluation device 10 is installed except that the evaluation device 10 should be installed at such a place as not to interfere with the tire uniformity tester 1, in particular, its running drum 4.

Figure 2:
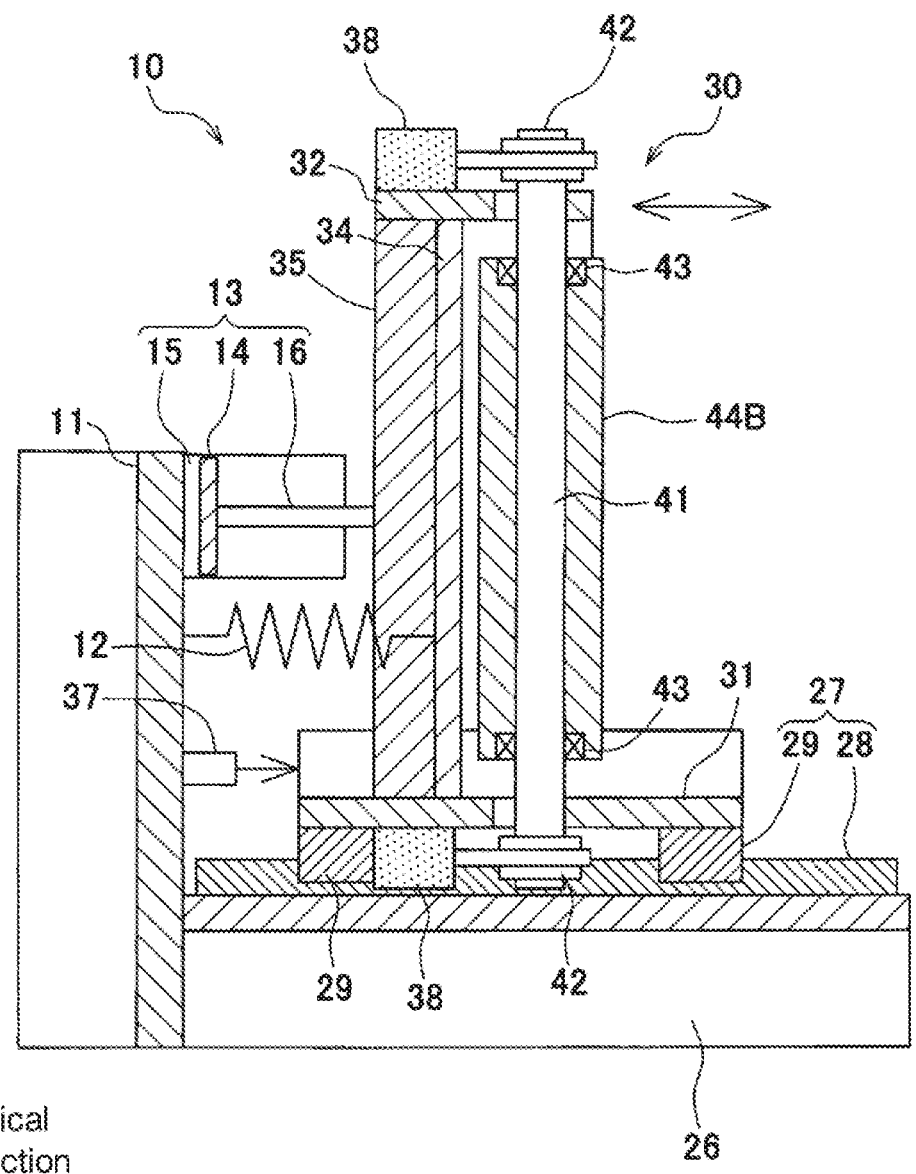
FIG. 2 is a sectional view of the device for evaluating tire rolling resistance viewed from the side.

The evaluation device 10 evaluates a rolling resistance of the tire 2 by bringing, into contact with the tire 2, the load roll 44 (see FIG. 2) having a surface (i.e., outer circumferential surface) that simulates a road surface on which a tire is to travel. The evaluation device 10 is fixed to a fixing member 6 that is installed on a base 5 so as to extend in the vertical direction.

The evaluation device 10 is equipped with an erected wall 11 fixed to the fixing member 6 so as to extend in the vertical direction (i.e., top-bottom direction in FIG. 2), a base frame 26 extending in a horizontal direction (i.e., left-right direction in FIG. 2) that is perpendicular to the erected wall 11, and a housing 30 configured to be moved in the horizontal direction on the base frame 26.

Figure 3:
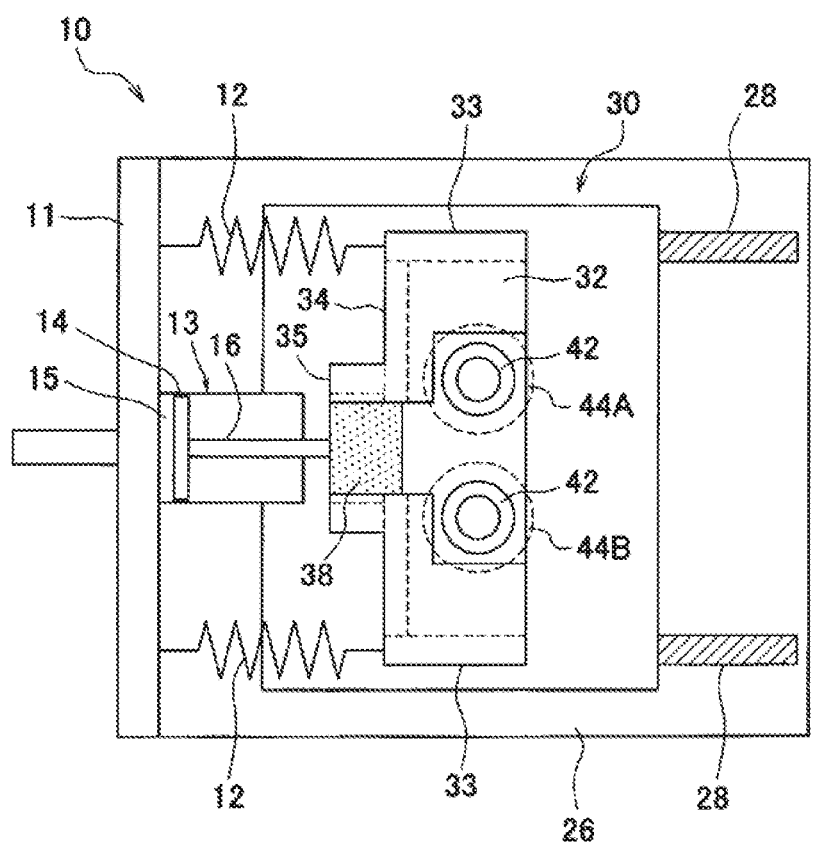
FIG. 3 is a plan view of the device for evaluating tire rolling resistance.

Also referring to FIG. 3, an air cylinder 13 that has a tip portion connected to a projected wall portion 35 of the housing 30 and thereby connects the erected wall 11 and the projected wall portion 35 of the housing 30 is fixed to the housing 30 side of the erected wall 11. It is desirable that the air cylinder 13 be disposed at such a position that the load rolls 44 can apply loads to the tire 2 at positions close to its center line. The air cylinder 13 is disposed at a position close to central portions of the load rolls 44 in the height direction and constitutes a moving mechanism.

The moving mechanism (i.e., air cylinder 13) moves, alternately, via the housing 30, the load rolls 44 in an approaching direction in which the load rolls 44 come closer to the tire 2 (rightward in FIG. 3) and in a leaving direction in which the load rolls 44 go away from the tire 2. (leftward in FIG. 3). The air cylinder 13 has a housing-30-side pressure chamber 15 that is defined by a piston 14, and moves the housing 30 by means of a piston rod 16 through switching of the pressure in the pressure chamber 15. Two springs 12 connecting the erected wall 11 and a back wall 34 of the housing 30 are disposed on the housing 30 side of the erected wall 11 so as to accompany the air cylinder 13. The two springs 12 urge the housing 30 toward the erected wall 11 without obstructing the movement of the load rolls 44 caused by the air cylinder 13.

Figure 5:
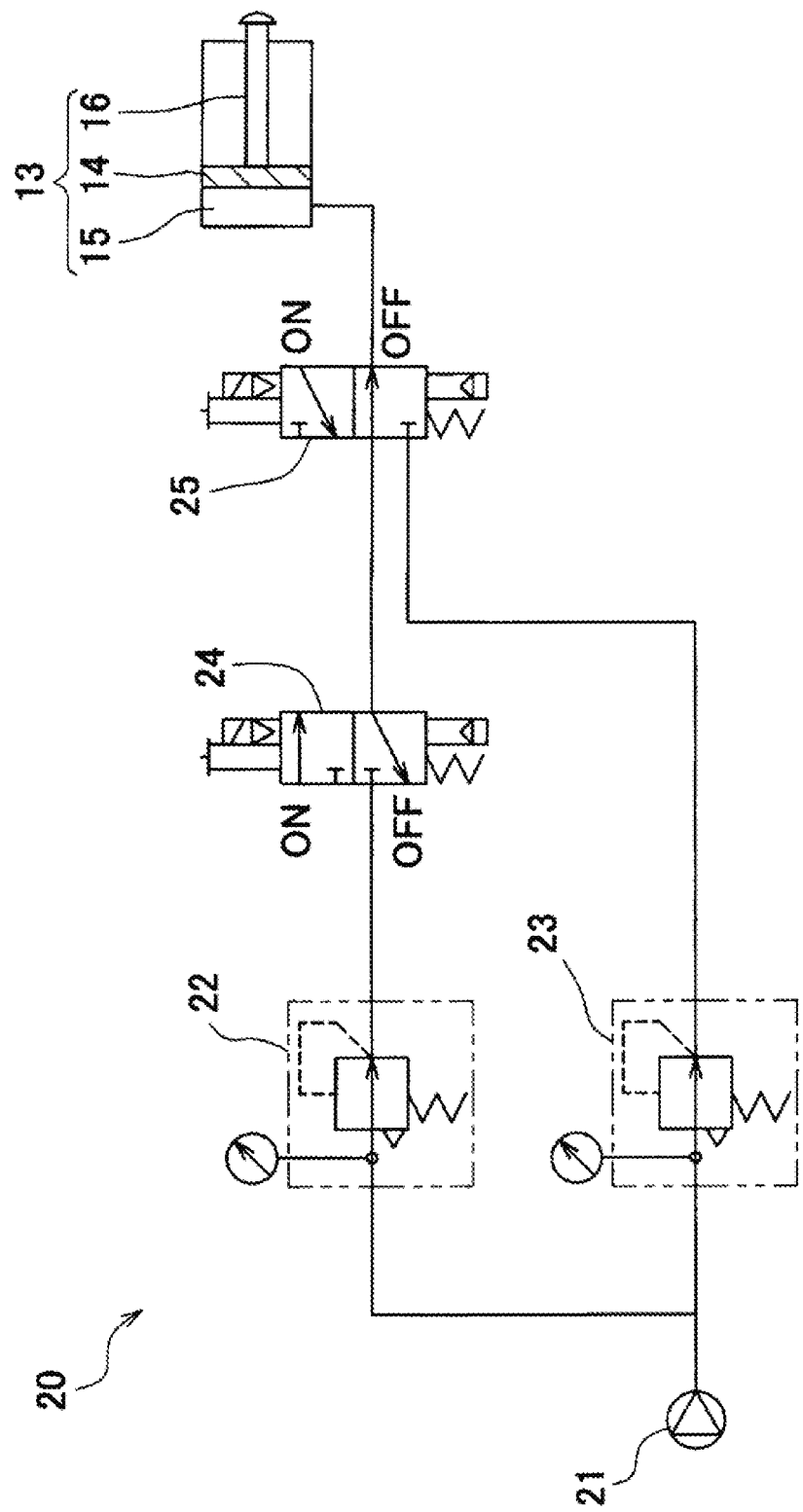
FIG. 5 is an air circuit diagram for driving an air cylinder.

FIG. 5 shows an air circuit 20 for driving the air cylinder 13. The pressure in the pressure chamber 15 of the air cylinder 13 is switched by the air circuit 20 that is connected to a pressure source 21. The air circuit 20 consists of a high-pressure-side high-pressure regulator 22 and a low-pressure-side low-pressure regulator 23 that are connected in parallel between the pressure source 21 and a second electromagnetic valve 25 that is connected to the air cylinder 13. A first electromagnetic valve 24 is connected between the high-pressure regulator 22 and the second electromagnetic valve 25. Switching the first electromagnetic valve 24 from off to on establishes a state where high-pressure air or low-pressure air can be supplied to the pressure chamber 15 of the air cylinder 13.

High-pressure air is supplied to the pressure chamber 15 by turning off the second electromagnetic valve 25 in a state where the first electromagnetic valve 24 is on. Low-pressure air is supplied to the pressure chamber 15 by turning on the second electromagnetic valve 25 in a state where the first electromagnetic valve 24 is on. If the first electromagnetic valve 24 and the second electromagnetic valve 25 are switched from on to off, supply of air to the pressure chamber 15 is stopped and the pressure in the pressure chamber 15 becomes atmospheric pressure.

Returning to FIG. 2, rails 28 of a pair of linear guides 27 extending straightly on the base frame 26 from the end on the erected wall 11 side to the end on the tire 2 side (i.e., the right-hand end in FIG. 2) are fixed to the top surface of the base frame 26.

Figure 4:
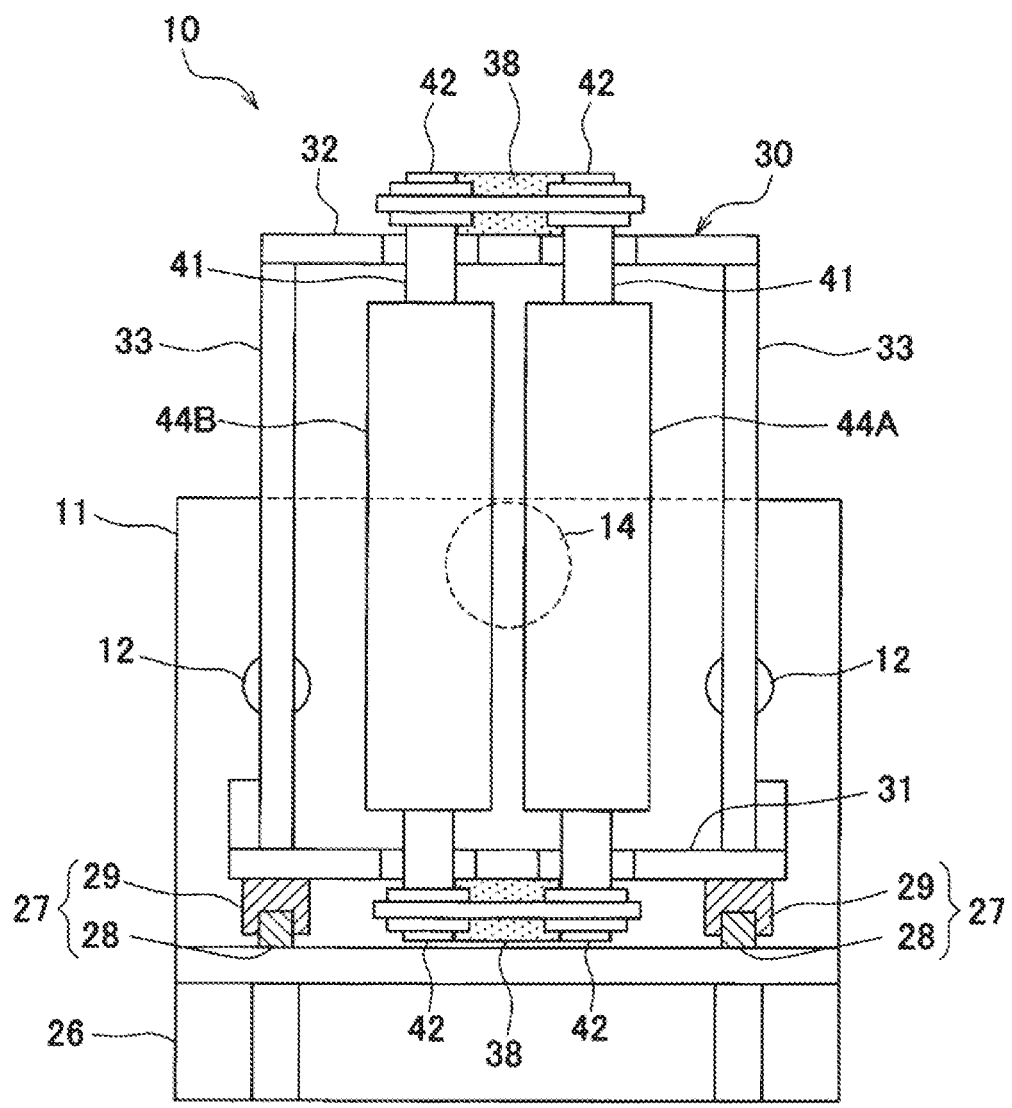
FIG. 4 is a front view of the device for evaluating tire rolling resistance.

The housing 30 supports the load roll 44 rotatably and reciprocates the load roll 44 against the tire 2 at constant vibration frequency along the linear guides 27. As seen by also referring to FIG. 4, the housing 30 has a vertically long box shape that is open on the front side (i.e., viewer's side in FIG. 4) and is equipped with a bottom wall 31, a top wall 32, side walls 33, a back wall 34 (see FIG. 3), and the projected wall portion 35.

The bottom surface of the bottom wall 31 is provided with sliders 29 that slide along the rails 28 of the linear guides 27. Attached to the base frame 26 via the linear guides 27, the housing 30 (i.e., load rolls 44) can be prevented from tilting. A variation amount of the housing 30 moving alongside the linear guides 27 is measured by a position sensor 37 fixed to the erected wall 11. In other words, by detecting a variation amount of the housing 30, the position sensor 37 detects a position of the load rolls 44 in a direction along the direction in which the load rolls 44 conic closer to the tire 2 and the direction in which the load rolls 44 go away from the tire 2. Although in the embodiment a non-contact laser displacement meter is used as the position sensor 37, the position sensor 37 may be a contact displacement meter or a non-contact eddy current displacement meter.

Load cells 38 that are load sensors for detecting a load acting on the tire 2 in a state where the surfaces of the load rolls 44 are in contact with the tire 2 are installed on the bottom surface of the bottom wall 31 and the top surface of the top wall 32, respectively. Top roll fixing members 42 fixing the top ends of two roll shafts 41 are attached to the upper load cell 38, and bottom roll fixing members 42 fixing the bottom ends of the two roll shafts 41 are attached to the lower load cell 38. Each of the two roll shafts 41 supports the associated load roll 44 rotatably via bearings 43. With the above configuration, when the load rolls 44 are pressed against the tread surface of the tire 2, loads are transmitted to the load cells 38 via the roll shafts 41 and the roll fixing members 42 and the load acting on the tire 2 is measured by the load cells 38. Since all of the loads acting on two load rolls 44 (44A, 44B) act on the load cells 38, the load can be measured accurately.

Figure 6:
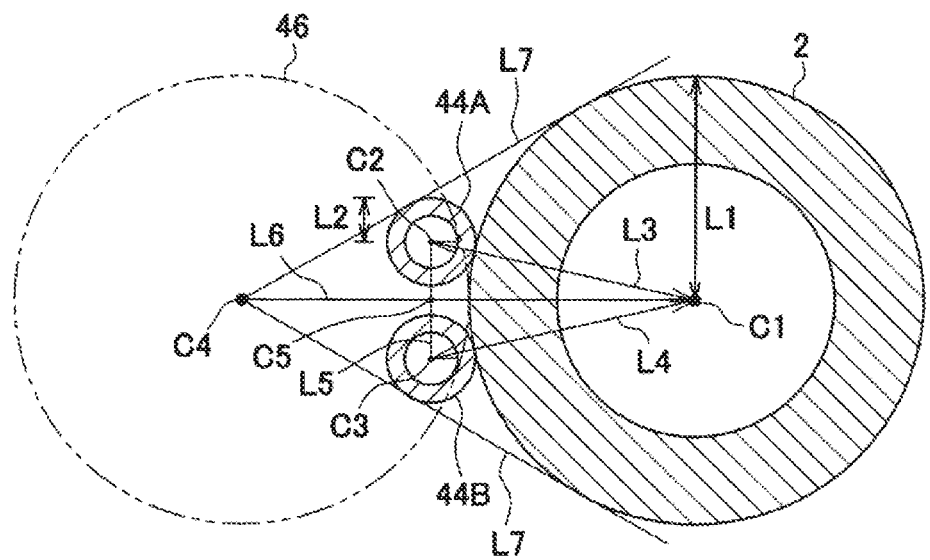
FIG. 6 is a plan sectional view of load rolls and a tire illustrating a relationship between the load rolls and the tire.

The load rolls 44 are cylindrical members whose axes extend in the vertical direction, and the outer circumferential surfaces of the load rolls 44 serve as simulated load surfaces for tire testing. FIG. 6 is a plan sectional view of the load rolls 44 and the tire 2 illustrating a relationship between the load rolls 44 and the tire 2 in a state where the load rolls 44 are in contact with the tire 2. The two load rolls 44A and 449 are disposed side by side and each of the load rolls 44A and 44B is smaller in outer diameter than the tire 2. A minimum value of the outer diameter of each load roll 44 is determined by its strength against a load. In the embodiment, the ratio between the diameter of the tire 2 and that of the load rolls 44A and 44B is 5:1. The two load rolls 44A and 44B have the same external dimension (i.e., same shape) and there are no particular limitations on specific numerical value of the outer diameter of the load rolls 44.

In the two load rolls 44, the distance L3 between the center C2 of the one load roll 44A and the center C1 of the tire 2 is equal to the distance L4 between the center C3 of the other load roll 44B and the center C1 of the tire 2. That is, the center C2 of the one load roll 44A and the center C3 of the other load roll 44B are located on a circle that is concentric with the tire 2. The center C5 of a line L5 that connects the center C2 of the one load roll 44A and the center C3 of the other load roll 44B is located on a line L6 that connects the center C1 of the tire 2 and the center C4 of an imaginary circle 46 (described later).

Furthermore, the center C2 of the one load roll 44A and the center C3 of the other load roll 44B are set so as to be located between two straight lines L7 that are tangential to the tire 2 and pass through the center C4 of the imaginary circle 46 that is tangential to the tire 2 and has the same diameter as the tire 2. The two load rolls 44A and 44B are disposed in such a manner that their outer circumferential surfaces are separated from each other.

Figure 8:
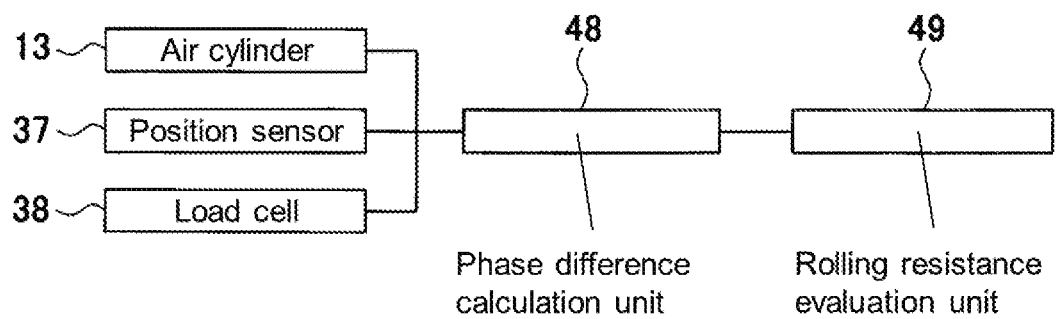
FIG. 8 is a block diagram illustrating an electrical configuration of the device for evaluating tire rolling resistance.

The evaluation device 10 is further equipped with a phase difference calculation unit 48 and a rolling resistance evaluation unit 49. As shown in FIG. 8, the aforementioned moving mechanism of the air cylinder 13, the position sensor 37 and the load cells 38 are connected to the phase difference calculation unit 48 and the phase difference calculation unit 48 is connected to the rolling resistance evaluation unit 49. The phase difference calculation unit 48 controls the air cylinder 13 so as to vary the load acting on the tire 2 and calculates a phase difference between a load variation and a variation of the surface position of the load roll 44 on the basis of signals from the position sensor 37 and the load cells 38. The rolling resistance evaluation unit 49 evaluates a rolling resistance of the tire 2 as an evaluation target by comparing the phase difference calculated for the tire 2 as the evaluation target by the phase difference calculation unit 48 with a phase difference that was calculated for a reference tire by the phase difference calculation unit 48.

Next, an evaluation method of a rolling resistance of the tire 2 using the evaluation device 10 according to the embodiment is described. A rolling resistance evaluation test is conducted after moving the running drum 4 away from the tire 2 after a tire uniformity test that was performed using the running drum 4.

In the evaluation device 10 according to the invention, the tire 2 is evaluated using a parameter tan δ that represents an attenuation property of a tire rubber. For example, resistance due to energy loss (i.e., hysteresis loss) that is caused by repeated deformation of a tire rubber deformed by a load due to its rotation is a major factor in generation of a tire rolling resistance. This hysteresis loss can be evaluated using tan δ. Parameter δ of tan δ corresponds to a phase difference between stress and deformation generated when a periodic external force is applied to a tire rubber. As the value of tan δ becomes larger, the energy loss due to a bend of a tire increases and, as a result, the rolling resistance increases.

Specifically, δ (i.e., phase difference) of tan δ can be measured by moving exciting) the surface of the aforementioned load roll 44 alternately in a direction in which the surface of the load roll 44 comes closer to the tire 2 and in a direction in which it goes away from the tire 2. More specifically, when the surface of the load roll 44 is moved alternately in these directions, a variation of the load acting on the tire 2 is observed a little in advance of a variation of the surface position of the load roll 44. The tangent of a phase deviation between these variations calculated by comparing these variations corresponds to the aforementioned tan δ. In the evaluation device 10 according to the embodiment, the rolling resistance of the tire 2 is evaluated on the basis of whether a value of tan δ calculated in this manner is larger than a predetermined threshold value.

In evaluating the rolling resistance of the tire 2 with the evaluation device 10, it is necessary to apply exciting force to the tire 2 by moving the load rolls 44 pressed against the tire 2 toward the tire 2. To move the load rolls 44 alternately in the approaching direction and in the leaving direction, the pressure supplied to the air cylinder 13 for driving the load rolls 44 is switched between high pressure and low pressure. The load rolls 44 apply exciting force to the tire 2 in this manner, whereby the load acting on the tire 2 is increased and decreased.

Figure 7:
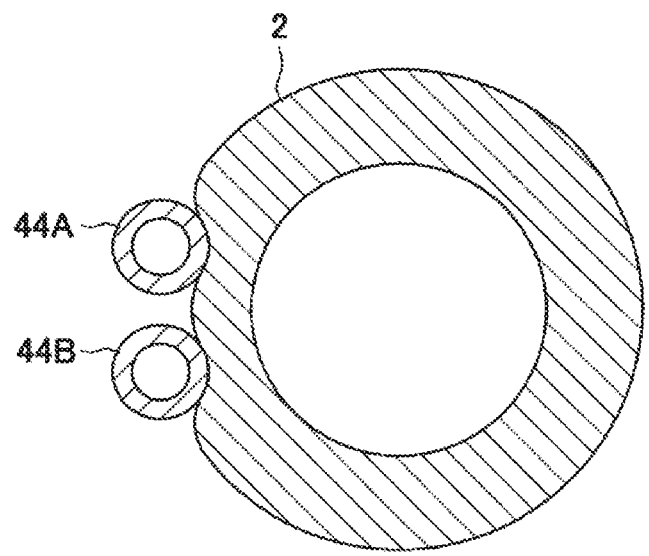
FIG. 7 is a plan sectional view of the load rolls and the tire illustrating a state where the load rolls are pressed against the tire.

More specifically, in an initial state, the first electromagnetic valve 24 and the second electromagnetic valve 25 are off and hence the pressure in the pressure chamber 15 of the air cylinder 13 is atmospheric pressure. In this state, since the springs 12 urge the housing 30 toward the erected wall 11, the load rolls 44 are separated from the tire 2. Starting from this state, the first electromagnetic valve 24 is switched on while the second electromagnetic valve 25 is kept off, whereby a high pressure is introduced into the pressure chamber 15 and the air cylinder 13 pushes the housing 30 toward the tire 2 against the urging forces of the springs 12. As a result, the load rolls 44 advance and are pressed against the tire 2 so that the load measured by the load cells 38 becomes equal to a prescribed load (see FIG. 7).

Then the second electromagnetic valve 25 is switched from off to on while the first electromagnetic valve 24 is kept on, whereby a low pressure is introduced into the pressure chamber 15 and the load rolls 44 retreat due to reaction forces from the tire 2. That is, the load rolls 44 retreat in the direction opposite to the pressing direction from the state where they were pressed against the tire 2, whereby the load is reduced.

Subsequently, the second electromagnetic valve 25 is switched on and off at a prescribed frequency while the first electromagnetic valve 24 is kept on, whereby the load rolls 44 apply a variable load to the tire 2 while the load rolls 44 are kept in contact with the tire 2.

In this case, a variation of the surface position of the load roll 44 is measured by the position sensor 37 and a variation of the load is measured by the load cells 38. Thus, the temporal variation of the position of the load roll 44 and the variation of the load are measured, and then curves as shown in FIG. 9 are obtained by extracting only excitation frequency components with a filter or the like and plotting them.

Figure 9:
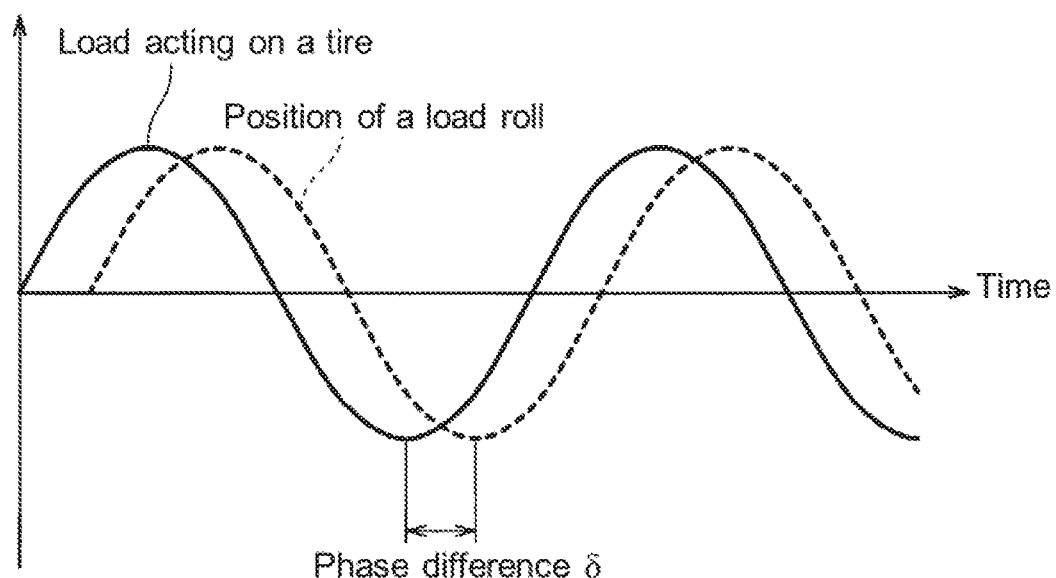
FIG. 9 is a graph schematically illustrating a phase difference between the displacement of load rolls and the load amplitude.

As shown in FIG. 9, because of the attenuation property of the tire rubber, the variation curve of the load is recorded so as to lead, by a phase difference δ, the variation curve of the roll displacement in the direction of the pressing force acting on the tire 2. Thus, the phase difference calculation unit 48 calculates a phase difference δ in the horizontal direction between the variation curve of the roll displacement and the variation curve of the load. Typically, in many cases, a phase difference between these signal waveforms is calculated by determining a transfer function by an FFT analysis.

A value of tan δ is calculated from the phase difference 3 thus calculated, and a rolling resistance of the tire 2 is evaluated on the basis of whether the calculated tan δ exceeds a predetermined threshold value. More specifically, first, a phase difference δ is measured for a reference tire that has no abnormality in properties. Subsequently, a phase difference δ of a tire as an evaluation target is measured. If the difference from the value of the phase difference δ of the reference tire is larger than an allowable range, in other words, if the phase difference δ is larger than the prescribed threshold value, it can be judged that the rolling resistance of the tire is larger than a standard value. Thus, if the phase difference δ is larger than the prescribed threshold value, the rolling resistance evaluation unit 49 judges that the tested tire is abnormal in rolling resistance and eliminates the tested tire if necessary.

If a calculated tan δ value is smaller than or equal to the predetermined threshold value (in other words, tan δ is within a prescribed range determined from the value of the phase difference δ of the reference tire), the rolling resistance evaluation unit 49 judges that the tire as an evaluation target has a normal rolling resistance and the tire is handled as one that satisfies product standards.

After completion of the rolling resistance evaluation test, the first electromagnetic valve 24 and the second electromagnetic valve 25 are switched from on to off to finish supply of pressure to the pressure chamber 15. As a result, the pressure in the pressure chamber 15 becomes atmospheric pressure and the springs 12 move the housing 30 toward the erected wall 11 while urging the housing 30. The load rolls 44 leave the tire 2.

The use of the aforementioned evaluation device 10 makes it possible to determine tan δ, which is highly correlated with a rolling resistance of a tire, and to evaluate the rolling resistance of the tire easily on the basis of the determined tan δ. This makes it possible to sort out tires that are abnormal in rolling resistance accurately in short time and hence to inspect rolling resistance values of all of numerous tire products manufactured.

[Features of Device for Evaluating Tire Rolling Resistance According to Embodiment]

The evaluation device 10 according to the embodiment has the following features.

In the evaluation device 10 according to the embodiment, because of the use of the load rolls 44 that are smaller in diameter than the tire 2, the mass of the load rolls 44 can be reduced to a large extent. This makes it possible to decrease the capacity of the motive power source for obtaining a prescribed excitation amplitude for the load rolls 44 and to reduce vibration and fatigue damage of the entire device and the moving mechanism. By disposing the two or more load rolls 44 side by side, the contact state of the tire 2 can be made closer to its actual ground contact state and the curvature of deformation of the tire 2 can be made smaller.

In the evaluation device 10 according to the embodiment, since the load rolls 44 are disposed separately from each tire testing machine for testing properties or performance of a tire such as a tire uniformity tester, a tire balancer, or a running test machine, a device for evaluating tire rolling resistance 10 having the same specification can be installed easily in various testing machines of different manufacturers or different models without modifying existing test machines or with subjecting them to only simple modifications.

In the evaluation device 10 according to the embodiment, since the load rolls 44 are disposed separately from the running drum 4 of the tire uniformity tester 1, which is a particular kind among tire testing machines, a device for evaluating tire rolling resistance 10 can be installed without modifying an existing tire uniformity tester 1 or with subjecting an existing tire uniformity tester 1 to only simple modifications.

In the evaluation device 10 according to the embodiment, as the radial dimension of the two load rolls 44 becomes larger, the distance between the centers of the two load rolls 44 increases and the contact states of the load rolls 44 and the tire 2 become much different from an actual ground contact state of the tire. In view of this, by locating the centers C2 and C3 of the load rolls 44 between the two straight lines L7 that are tangential to the tire 2 and pass through the center C4 of the imaginary circle 46 that is tangential to the tire 2 and has the same diameter as the outer diameter of the tire 2, the distance between the centers of the two load rolls 44 can be made small and the contact state of the tire 2 can be made closer to its actual ground contact state.

In the evaluation device 10 according to the embodiment, in the case the moving mechanism has the air cylinder 13, the air cylinder 13 is provided as an inexpensive and simple motive power source. Switching the pressure supplied to the air cylinder 13 between a high pressure and a low pressure allows the load rolls 44 to apply stable exciting force to the tire 2.

The embodiment of the invention is described above with reference to the drawings, it should be noted that specific configurations are possible that are different from the embodiment. The scope of the invention is determined by not only the aforementioned embodiment but also the claims and includes all modifications made within the confines of the claims and their equivalents.

Although in the embodiment the evaluation device 10 is attached to the tire uniformity tester 1, the same advantages can be obtained when it is attached to any of various tire testing machines for testing properties or performance of a tire such as a tire balancer and a running test machine.

Although in the embodiment the two load rolls 44 are used, there is no particular limitation on the number of load rolls 44 except that plural (e.g., three) load rolls 44 should be used. Furthermore, there is no particular limitation on the specific value of the outer diameter of the load rolls 44 except that their outer diameter should be smaller than the outer diameter of the tire 2.

Although in the embodiment the two load rolls 44 have the same outer diameter, plural load rolls having different outer diameters may be used. Furthermore, in the embodiment, the distance L3 between the center C2 of the one load roll 44A and the center C1 of the tire 2 is equal to the distance L4 between the center C3 of the other load roll 44B and the center C1 of the tire 2. However, the invention is not limited this case. The distances L3 and L4 may be different from each other.

Although in the embodiment the air cylinder 13 is used to apply exciting force to the load rolls 44 and the tire 2, the invention is not limited this case. The same advantages can be obtained by, for example, a combination of a hydraulic cylinder and a hydraulic circuit or a combination of a ball screw and a servo motor. An example in which a ball screw and a servo motor are used is described later as a second modification.

Figure 10:
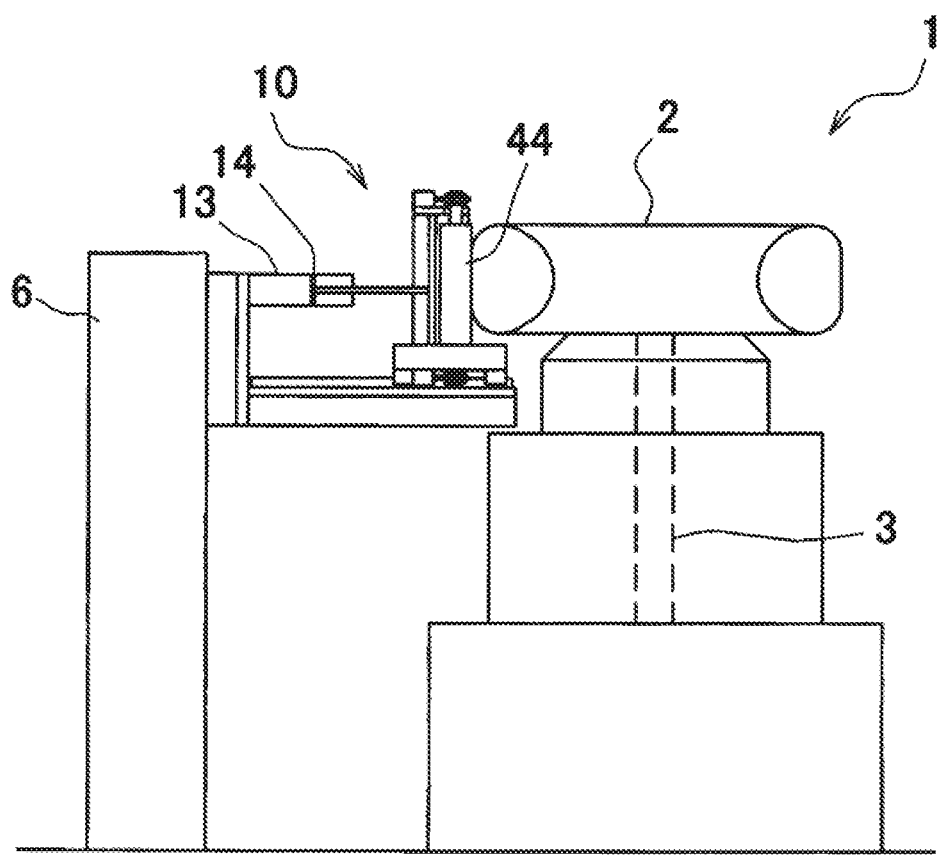
FIG. 10 is a side view of a device for evaluating tire rolling resistance that is applied to a tire having a small outer diameter.
Figure 11:
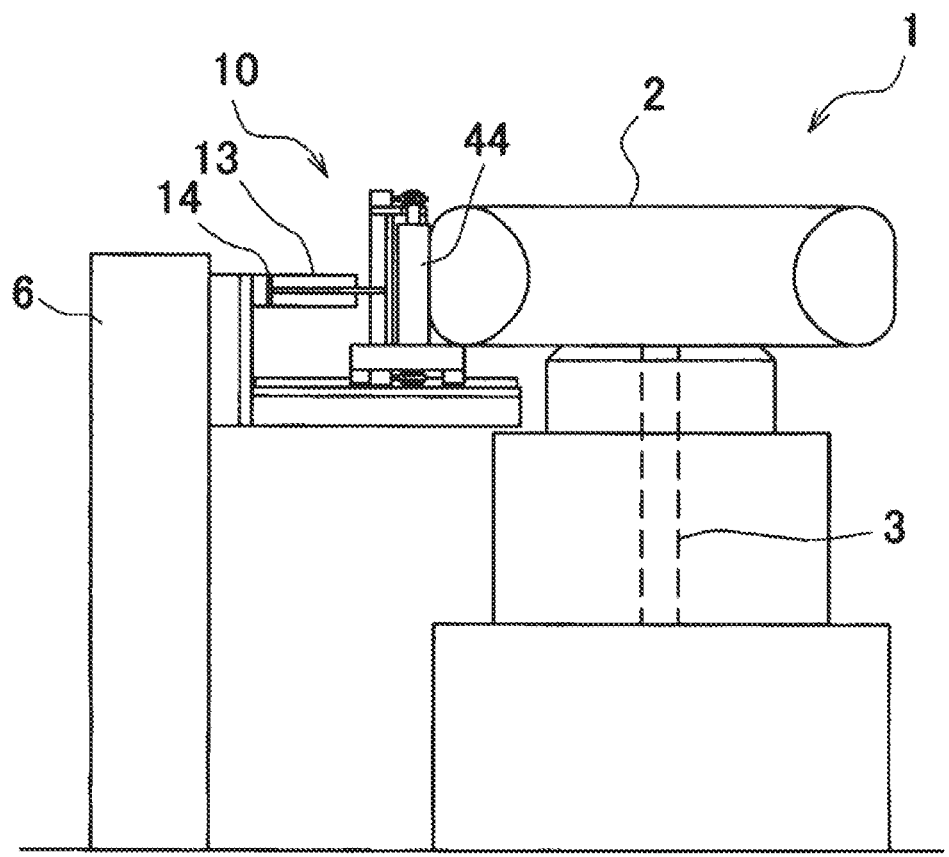
FIG. 11 is a side view of the device for evaluating tire rolling resistance that is applied to a tire having a large outer diameter.

The evaluation device 10 according to the invention can be applied to various tires 2 that are different from each other in outer diameter. FIG. 10 is a side view of the evaluation device 10 applied to a tire 2 that is smaller in outer diameter than the tire 2 used in the embodiment. In this case, the load rolls 44 are pressed against the tire 2 by elongating the stroke of the air cylinder 13 by moving the piston 14 of the air cylinder 13 toward the side of the tire 2. FIG. 11 is a side view of the evaluation device 10 applied to a tire 2 that is larger in outer diameter than the tire 2 used in FIG. 10. In this case, the load rolls 44 are pressed against the tire 2 by shortening the stroke of the air cylinder 13 by moving the piston 14 of the air cylinder 13 toward the side of the fixing member 6.

Modification 1

Figure 12:
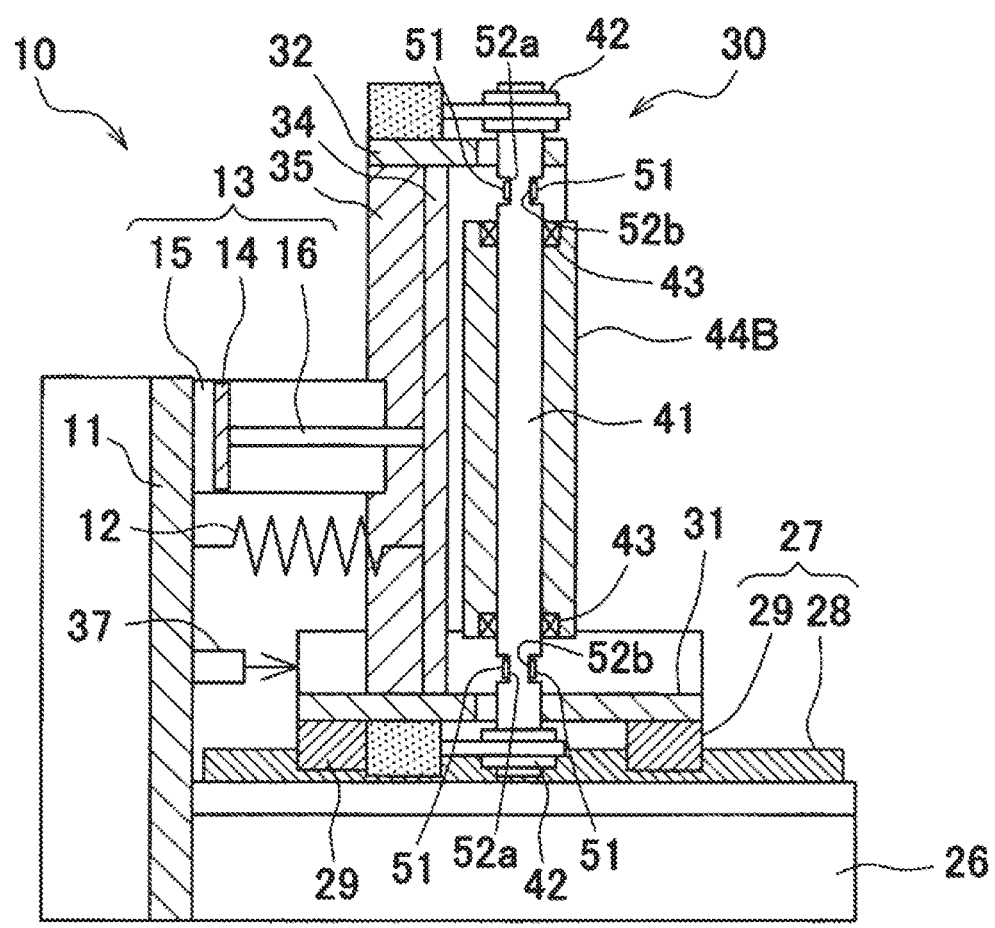
FIG. 12 is a side view of a device for evaluating tire rolling resistance according to a first modification.
Figure 13:
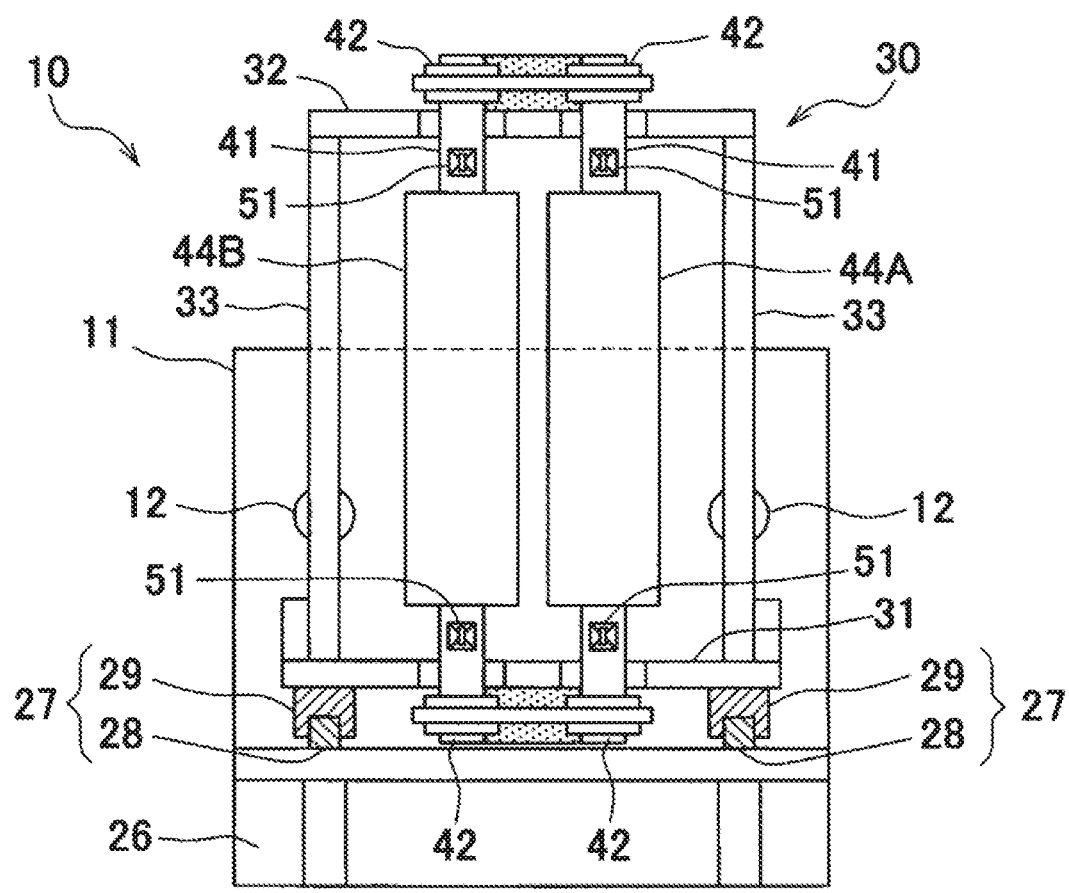
FIG. 13 is a front view of the device for evaluating tire rolling resistance according to the first modification.

In the aforementioned embodiment, the load cells are used as the load sensors for measuring a load acting on a tire 2 when the load rolls 44 are pressed against the tread surface of the tire 2. In contrast, in an evaluation device 10 according to a first modification shown in FIG. 12 and FIG. 13, stress gauges 51 are used as the load sensors in place of the load cells. Since the other parts of the configuration of the evaluation device 10 are the same as the aforementioned embodiment, the same reference symbols are assigned to the same elements as employed in the embodiment and the descriptions thereof are omitted.

In the first modification, top and bottom end portions of each roll shaft 41 are formed with cutouts 52 (52a and 52b). One cutout 52a formed in one of the top and bottom end portions is opposed to the back wall 34 of the housing 30 and the other cutout 52b is formed on the opposite side of the center axis of the roll shaft 41 to the one cutout 52*a*. A load applied to the tire can be measured by attaching stress gauges 51 to the respective cutouts 52.

Modification 2

Figure 14:
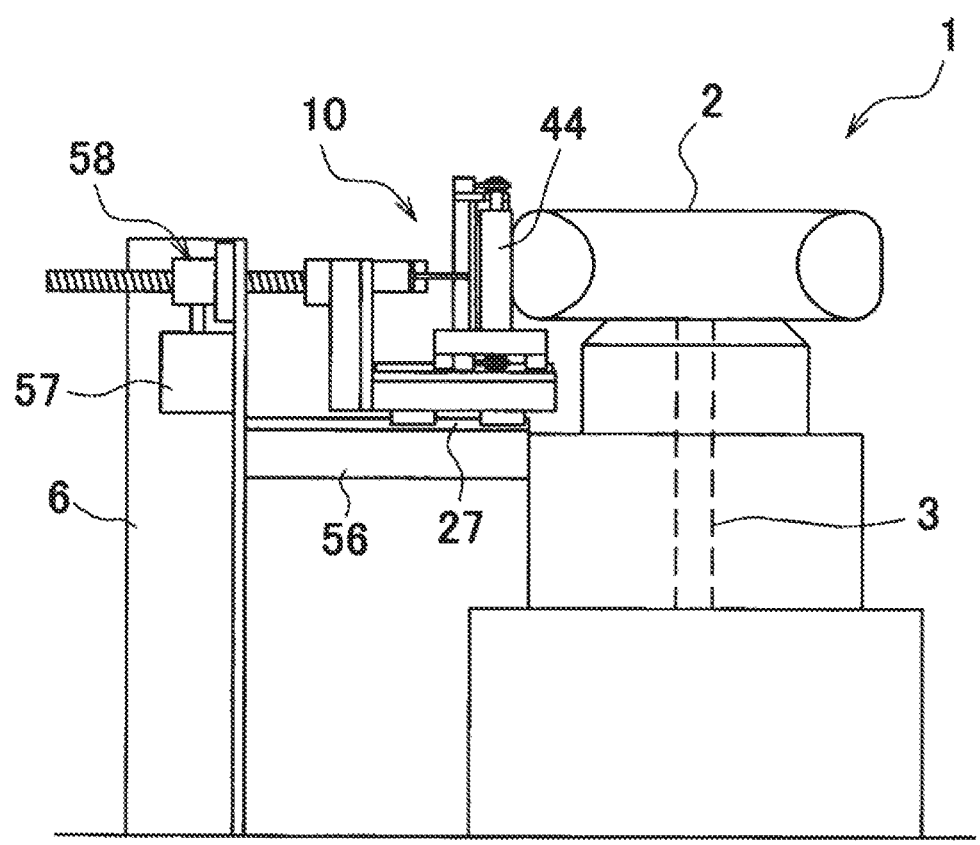
FIG. 14 is a side view of a device for evaluating tire rolling resistance according to a second modification that is applied to a tire having a small outer diameter.
Figure 15:
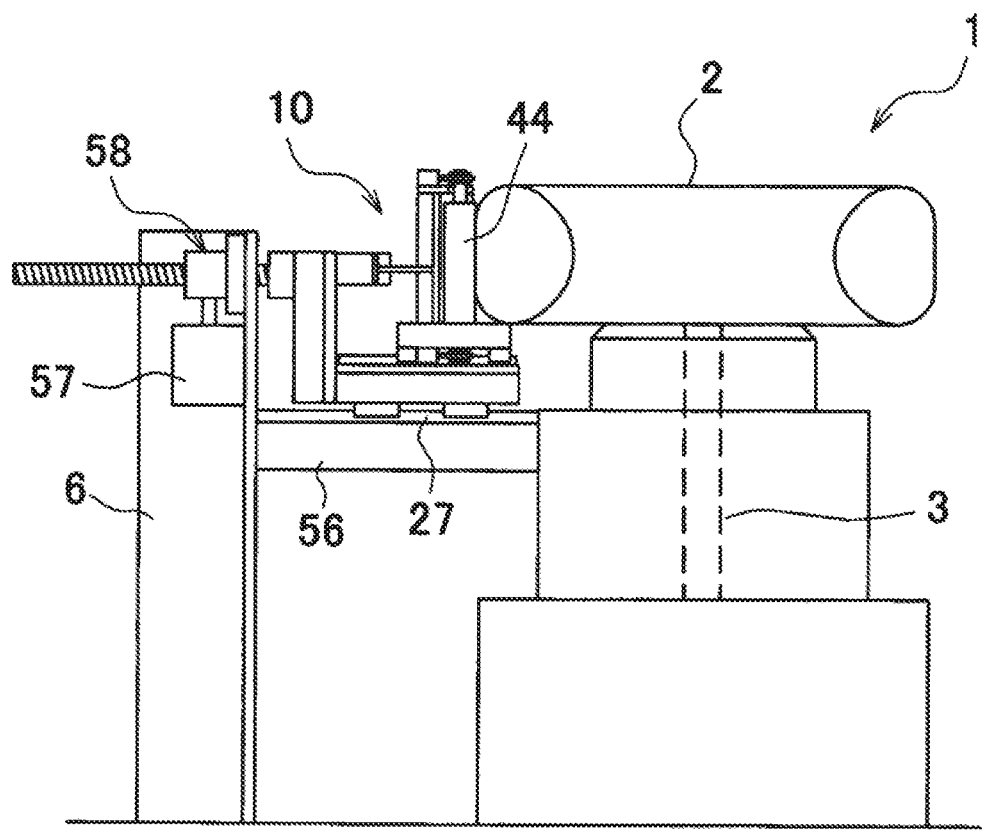
FIG. 15 is a side view of the device for evaluating tire rolling resistance according to the second modification that is applied to a tire having a large outer diameter.

In the aforementioned embodiment, the evaluation device 10 is fixed directly to the fixing member 6. However, the invention is not limited to this case. The evaluation device 10 may be installed on the fixing member 6 so as to be movable with respect to a tire 2. More specifically, as shown in FIG. 14 and FIG. 15, the evaluation device 10 is installed, via linear guides 27, on a base portion 56 that is fixed to a fixing member 6. The evaluation device 10 thus installed is moved relative to the tire 2 by a ball screw 58 that is driven by a servo motor 57 that is fixed to the fixing member 6. The evaluation device 10 having this configuration can be applied to various tires 2 having different outer diameters.

The present application is based on Japanese Patent Application No. 2016-183371 filed on Sep. 20, 2016, the disclosure of which is incorporated herein by reference.

DESCRIPTION OF SYMBOLS

1: Tire uniformity tester (tire testing machine)
2: Tire
4: Running drum
10: Device for evaluating tire rolling resistance
12: Spring (moving mechanism)
13: Air cylinder (moving mechanism)
37: Position sensor
38: Load cell (load sensor)
44, 44A, 44B: Load roll
46: Imaginary circle
48: Phase difference calculation unit
49: Rolling resistance evaluation unit
51: Stress gauge (load sensor)

The invention claimed is:

1. A device for evaluating tire rolling resistance, the device comprising:
   load rolls having surfaces that simulate a road surface on which a tire is to travel;
   a moving mechanism configured to move the load rolls alternately in an approaching direction in which the load rolls come closer to the tire and in a leaving direction in which the load rolls go away from the tire;
   a load sensor configured to detect a load acting on the tire in a state where the surface of the load rolls are in contact with the tire;
   a position sensor configured to detect a position of the load roll in a direction along the approaching direction and the leaving direction;
   a phase difference calculation unit configured to control the moving mechanism so that the load acting on the tire is varied and calculate a phase difference between a variation of the load and a variation of the position of the load roll on the basis of signals from the load sensor and the position sensor; and
   a rolling resistance evaluation unit configured to evaluate a rolling resistance of the tire as an evaluation target by comparing the phase difference calculated for the tire as the evaluation target by the phase difference calculation unit with another phase difference calculated for a reference tire by the phase difference calculation unit,
   wherein the load rolls are two or more load rolls disposed side by side and are smaller in diameter than the tire.

2. The device for evaluating tire rolling resistance according to claim 1, wherein the load rolls are disposed separately from a tire testing machine for testing the tire.

3. The device for evaluating tire rolling resistance according to claim 2, wherein the load rolls are disposed separately from a running drum of the tire testing machine.

4. The device for evaluating tire rolling resistance according to claim 3,
   wherein the load rolls are two load rolls, and
   wherein the centers of the respective load rolls are located between two straight lines that are tangential to the tire and pass through the center of an imaginary circle that is tangential to the tire and has a same diameter as an outer diameter of the tire.

5. The device for evaluating tire rolling resistance according to claim 4,
   wherein the moving mechanism has an air cylinder, and
   wherein the load rolls are configured to apply exciting force to the tire by switching the pressure supplied to the air cylinder between high pressure and low pressure.

6. The device for evaluating tire rolling resistance according to claim 3,
   wherein the moving mechanism has an air cylinder, and
   wherein the load rolls are configured to apply exciting force to the tire by switching the pressure supplied to the air cylinder between high pressure and low pressure.

7. The device for evaluating tire rolling resistance according to claim 2,
   wherein the moving mechanism has an air cylinder, and
   wherein the load rolls are configured to apply exciting force to the tire by switching the pressure supplied to the air cylinder between high pressure and low pressure.

8. The device for evaluating tire rolling resistance according to claim 1,
   wherein the load rolls are two load rolls, and
   wherein the centers of the respective load rolls are located between two straight lines that are tangential to the tire and pass through the center of an imaginary circle that is tangential to the tire and has a same diameter as an outer diameter of the tire.

9. The device for evaluating tire rolling resistance according to claim 8,
   wherein the moving mechanism has an air cylinder, and
   wherein the load rolls are configured to apply exciting force to the tire by switching the pressure supplied to the air cylinder between high pressure and low pressure.

10. The device for evaluating tire rolling resistance according to claim 1,
    wherein the moving mechanism has an air cylinder, and
    wherein the load rolls are configured to apply exciting force to the tire by switching the pressure supplied to the air cylinder between high pressure and low pressure.

* * * * *